United States Patent
He (10) Patent No.: US 12,235,649 B2
(45) Date of Patent: Feb. 25, 2025

(54) AUTONOMOUS ROBOT, MOVING PATH PLANNING METHOD AND APPARATUS THEREFOR, AND STORAGE MEDIUM

(71) Applicant: Positec Power Tools (Suzhou) Co., Ltd., Suzhou (CN)

(72) Inventor: Mingming He, Suzhou (CN)

(73) Assignee: Positec Power Tools (Suzhou) Co., LTD., Suzhou (CN)

( * ) Notice: Subject to any disclaimer, the term of this patent is extended or adjusted under 35 U.S.C. 154(b) by 374 days.

(21) Appl. No.: 17/764,138

(22) PCT Filed: Sep. 25, 2020

(86) PCT No.: PCT/CN2020/117800
§ 371 (c)(1),
(2) Date: Mar. 25, 2022

(87) PCT Pub. No.: WO2021/057909
PCT Pub. Date: Apr. 1, 2021

(65) Prior Publication Data
US 2022/0390953 A1 Dec. 8, 2022

(30) Foreign Application Priority Data
Sep. 27, 2019 (CN) .......................... 201910924785.4

(51) Int. Cl.
*G05D 1/00* (2024.01)
(52) U.S. Cl.
CPC ......... *G05D 1/0219* (2013.01); *G05D 1/0088* (2013.01)

(58) Field of Classification Search
CPC .................................................. G05D 1/0219
See application file for complete search history.

(56) References Cited

U.S. PATENT DOCUMENTS 10,126,754 B2 * 11/2018 Ogura .................. G05D 1/0016
2003/0217537 A1 11/2003 Schlesser et al.
(Continued)

FOREIGN PATENT DOCUMENTS

| CN | 201178584 Y | 1/2009 |
| CN | 103125202 A | 6/2013 |

(Continued)

OTHER PUBLICATIONS

English WIPO translation of WO-2020002964-A1. (Year: 2020).*
(Continued)

*Primary Examiner* — Jason Holloway
*Assistant Examiner* — Christopher A Buksa
(74) *Attorney, Agent, or Firm* — Lee & Hayes, P.C.

(57) ABSTRACT

Embodiments of this specification provide an autonomous robot, a moving path planning method and apparatus therefor, and a storage medium. The method includes: obtaining terrain distribution information of a target working area; determining, according to the terrain distribution information, whether a slope area exists in the target working area; and determining, if a slope area exists in the target working area, a width value between adjacent path segments according to the terrain distribution information during planning of a moving path in the slope area, to keep a work overlap value between the adjacent path segments within a specified range.

12 Claims, 6 Drawing Sheets

(56) References Cited

U.S. PATENT DOCUMENTS

| | | |
|---|---|---|
| 2004/0193348 A1 | 9/2004 | Gray et al. |
| 2008/0295475 A1 | 12/2008 | Boyko |
| 2015/0366130 A1 | 12/2015 | Bergstrom |
| 2016/0088794 A1 | 3/2016 | Baumgarten et al. |
| 2017/0020069 A1 | 1/2017 | Atsumi |
| 2019/0243386 A1 | 8/2019 | Lee |

FOREIGN PATENT DOCUMENTS

| | | | |
|---|---|---|---|
| CN | 103781343 A | 5/2014 | |
| CN | 106239507 A | 12/2016 | |
| CN | 106760261 A | 5/2017 | |
| CN | 107402570 A | 11/2017 | |
| CN | 107643750 A | 1/2018 | |
| CN | 108732590 A | 11/2018 | |
| CN | 108958066 A | 12/2018 | |
| CN | 108981726 A | 12/2018 | |
| CN | 109006783 A | 12/2018 | |
| CN | 109041755 A | 12/2018 | |
| CN | 109425352 A | 3/2019 | |
| CN | 109634285 A | 4/2019 | |
| CN | 109729814 A | 5/2019 | |
| CN | 109834711 A | 6/2019 | |
| CN | 208953962 U | 6/2019 | |
| CN | 110132215 A | 8/2019 | |
| CN | 110168465 A | 8/2019 | |
| EP | 3521965 A1 | 8/2019 | |
| JP | 2019204544 A * | 11/2019 | ............ A01B 69/008 |
| PT | 107937 A | 4/2016 | |
| WO | 2017169373 | 10/2017 | |
| WO | WO2017198226 A1 | 11/2017 | |
| WO | 2018/124662 A1 | 7/2018 | |
| WO | WO2019084767 A1 | 5/2019 | |
| WO | WO2019148530 A1 | 8/2019 | |
| WO | WO-2020002964 A1 * | 1/2020 | ............. B60R 21/00 |

OTHER PUBLICATIONS

English WIPO Translation of JP-2019204544-A. (Year: 2019).*

First Office Action in CN application No. CN201910924785.4, dated Sep. 1, 2021.

First search in CN application No. CN201910924785.4, dated Sep. 1, 2021.

* cited by examiner

AUTONOMOUS ROBOT, MOVING PATH PLANNING METHOD AND APPARATUS THEREFOR, AND STORAGE MEDIUM

CROSS-REFERENCE TO RELATED APPLICATION

This application is a National Stage Application of International Application No. PCT/CN2020/117800, filed on Sep. 25, 2020, which claims benefit of and priority to Chinese Patent Application No. 201910924785.4, filed on Sep. 27, 2019, all of which are hereby incorporated by reference in their entirety for all purposes as if fully set forth herein.

BACKGROUND

Technical Field

This specification relates to the field of robotic technologies, and in particular, to an autonomous robot, a moving path planning method and apparatus therefor, and a storage medium.

Related Art

An autonomous robot (also referred to as a self-moving robot) is a robot that has a body provided with various necessary sensors and controllers and can independently complete a particular task without external manual information input and control during operation. That is, the autonomous robot can move autonomously to perform a work task in a working area.

In a full-coverage working mode, the autonomous robot generally moves along a planned full-coverage moving path to work. At present, in an existing algorithm for planning a full-coverage moving path, a path planning algorithm based on an ox-turning method (a square wave-shaped path) is widely used in actual production for its simple principle and easy implementation.

SUMMARY

An objective of embodiments of this specification is to provide an autonomous robot, a moving path planning method and apparatus therefor, and a storage medium, to improve a work coverage ratio of the autonomous robot in a full-coverage mode.

To achieve the above objective, according to an aspect, an embodiment of this specification provides a moving path planning method for an autonomous robot, including:
  obtaining terrain distribution information of a target working area;
  determining, according to the terrain distribution information, whether a slope area exists in the target working area; and
  adjusting, if a slope area exists in the target working area, a width value between adjacent path segments according to the terrain distribution information during planning of a moving path in the slope area, to keep a work overlap value between the adjacent path segments within a specified range.

According to another aspect, an embodiment of this specification further provides a moving path planning apparatus for an autonomous robot, including:
  a terrain information obtaining module, configured to obtain terrain distribution information of a target working area;
  a slope area determining module, configured to determine, according to the terrain distribution information, whether a slope area exists in the target working area; and a moving path planning module, configured to adjust, if a slope area exists in the target working area, a width value between adjacent path segments according to the terrain distribution information during planning of a moving path in the slope area, to keep a work overlap value between the adjacent path segments within a specified range.

According to another aspect, an embodiment of this specification further provides an autonomous robot, configured with the foregoing moving path planning apparatus.

According to another aspect, an embodiment of this specification further provides a computer storage medium storing a computer program, the computer program, when executed by a processor, implementing the foregoing moving path planning method.

According to another aspect, an embodiment of this specification further provides another moving path planning method for an autonomous robot, including: automatically adjusting a work overlap value between adjacent path segments during planning of a moving path in a target working area.

In an embodiment, the automatically adjusting a work overlap value between adjacent path segments includes:
  automatically adjusting the work overlap value between the adjacent path segments according to environmental information of the autonomous robot.

In an embodiment, the automatically adjusting the work overlap value between the adjacent path segments according to environmental information of the autonomous robot includes:
  obtaining terrain distribution information of the target working area;
  determining, according to the terrain distribution information, whether a slope area exists in the target working area; and
  adjusting, if a slope area exists in the target working area, a width value between adjacent path segments according to the terrain distribution information during planning of a moving path in the slope area, to keep a work overlap value between the adjacent path segments within a specified range.

According to another aspect, an embodiment of this specification further provides another moving path planning apparatus for an autonomous robot, configured to automatically adjust a work overlap value between adjacent path segments during planning of a moving path in a target working area.

As can be seen from the technical solution provided in the embodiments of this specification, in the embodiments of this specification, during planning of a moving path in a target working area, a work overlap value between adjacent path segments can be automatically adjusted, to keep the work overlap value between the adjacent path segments within an appropriate range. Therefore, the problem that the autonomous robot misses a working area in a high slope scenario can be effectively prevented, and a work coverage ratio of the autonomous robot in a full-coverage mode is therefore improved.

BRIEF DESCRIPTION OF THE DRAWINGS

To describe the technical solutions in the embodiments of this specification or in the prior art more clearly, the following briefly introduces the accompanying drawings required for describing the embodiments or the prior art. Apparently, the accompanying drawings in the following description show merely some embodiments of this specification, and a person of ordinary skill in the art may still derive other drawings from these accompanying drawings without creative efforts. In the accompanying drawings.

DETAILED DESCRIPTION

To enable a person skilled in the art to better understand the technical solutions in this specification, the technical solutions of the embodiments of this specification will be described clearly and thoroughly below with reference to the accompanying drawings of the embodiments of this specification. Apparently, the described embodiments are merely some rather than all of the embodiments of this specification. All other embodiments obtained by a person of ordinary skill in the art based on the embodiments of this specification without creative efforts shall fall within the protection scope of this specification.

For ease of description, in some embodiments described below, an example in which a full-coverage working path is a square wave-shaped path is used for description. However, it should be understood by those skilled in the art that this specification is not limited thereto. In other embodiments, the full-coverage working path may be a spiral path or a concentric rectangle path.

Environmental information in this specification refers to terrain distribution environmental information (hereinafter referred to as terrain distribution information). The terrain distribution information may be used for representing an absolute height, a relative height difference, or steepness of a slope of earth surface morphology. For ease of description, in some embodiments described below, an example in which the terrain distribution information is slope distribution information is used for description. However, this specification is not limited thereto. In other embodiments, the terrain distribution information may be an absolute height distribution, a relative height difference distribution, a height change rate distribution, or the like.

Maps mentioned in this specification are all two-dimensional maps. Specifically, the maps mentioned in this specification may be topographic maps or plane maps.

A slope area in this specification refers to an area with terrain distribution satisfying set conditions in a target working area. For example, in some embodiments of this specification, slope distribution information is used as an example. An area with a slope angle value reaching a first slope angle value in a target working area may be used as a slope area.

Figure 1:
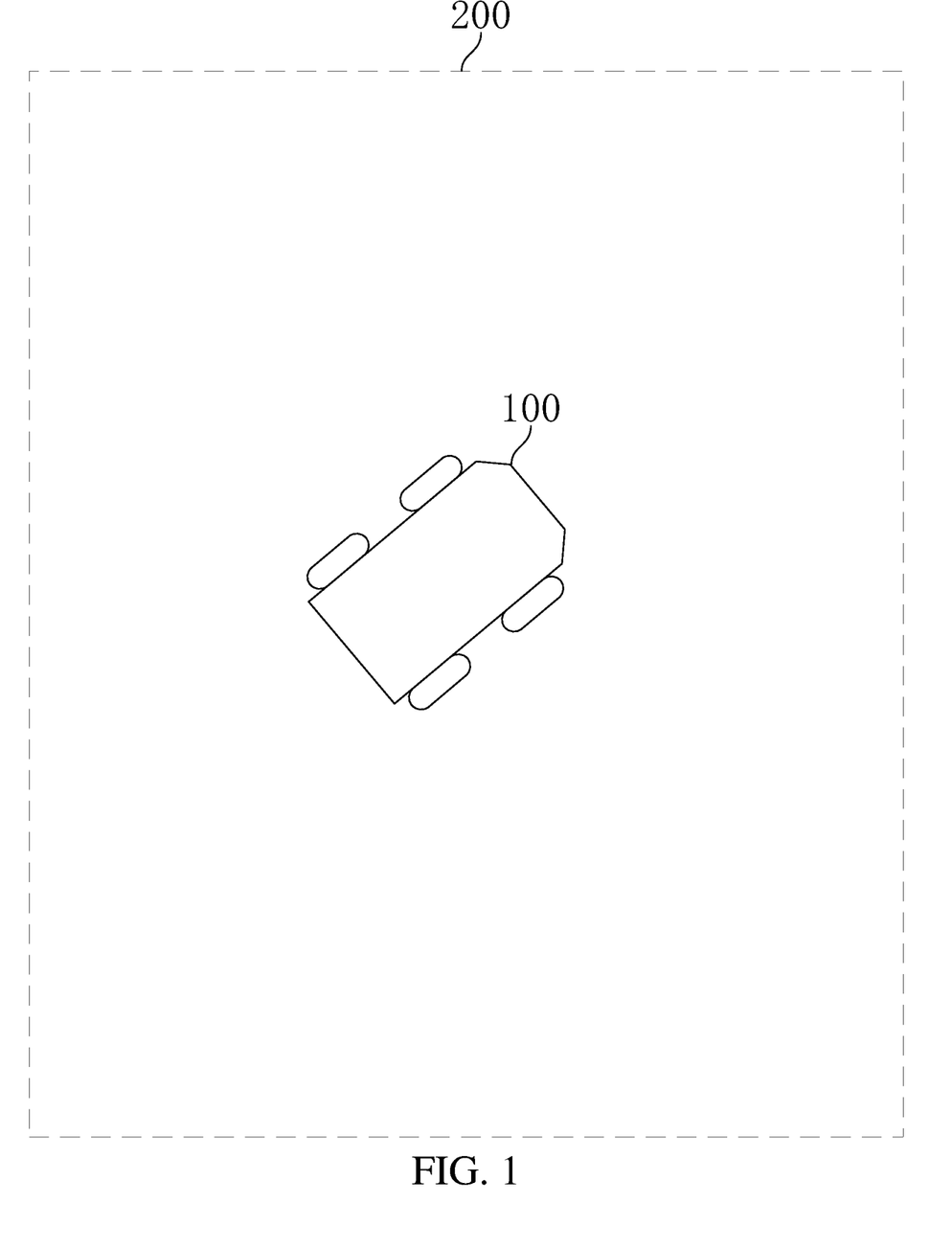
FIG. 1 is a schematic structural diagram of an autonomous robot according to some embodiments of this specification.

Referring to FIG. 1, an autonomous robot 100 according to some embodiments of this specification may move autonomously within a working area 200 to automatically perform a work task. In some exemplary embodiments, the autonomous robot 100 may be, for example, an automatic lawn mower, an automatic cleaning device, an automatic watering apparatus, or an automatic snow sweeper.

In a full-coverage working mode, the autonomous robot generally moves along a planned full-coverage moving path to work.

Figure 2:
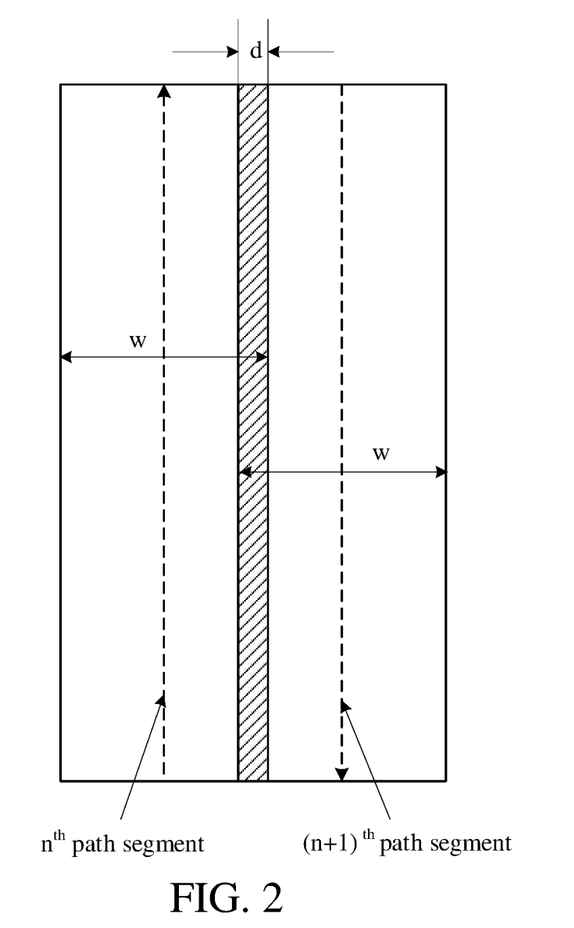
FIG. 2 is a schematic diagram of a work overlap value according to an embodiment of this specification.

When the autonomous robot plans the full-coverage working path based on an ox-turning method or another method, the working area is generally flat by default. When the autonomous robot moves in a flat working area, a work overlap value between adjacent path segments is fixed, and a coverage of full-coverage work can be ensured. In an embodiment of this specification, the work overlap value refers to an overlapped portion between a working width of the autonomous robot working along one of the adjacent path segments and a working width of the autonomous robot working along the other of the adjacent path segments. For example, in FIG. 2, an $n^{th}$ path segment is adjacent to an $(n+1)^{th}$ path segment, a working width of the autonomous robot working along the $n^{th}$ path segment is w, a working width of the autonomous robot working along the $(n+1)^{th}$ path segment is w, and a work overlap value between the two adjacent path segments is d (for example, as shown by a portion where oblique lines are drawn in FIG. 2).

However, in practice, the autonomous robot may sometimes work in a non-flat working area. For example, in a scenario shown in FIG. 3, when the autonomous robot works in a flat area, a work overlap value between adjacent path segments (as shown by the vertical dashed lines in FIG. 3) is a default value (for example, $\Delta_1$ in FIG. 3). When the autonomous robot works in an area with a slope 1, a work overlap value between adjacent path segments is $\Delta_2 = A-(A-\Delta_1)/\cos \alpha$, where A is a working width of the autonomous robot, $\alpha$ is a slope angle of the slope 1, $\cos \alpha = L_1/L_2$, $L_1$ is a width between adjacent path segments in the flat area, and $L_2$ is a width between adjacent path segments in the area with the slope 1. Because $L_2 > L_1$ and the working width of the autonomous robot is fixed, $\Delta_2 < \Delta_1$. When the autonomous robot works on slope 2 with a larger slope angle, a work overlap value between adjacent path segments is $\Delta_3 = A-(A-\Delta_1)/\cos \beta$, $\beta$ is a slope angle of the slope 2, $\cos \beta = L_1/L_3$, and $L_3$ is a width between adjacent path segments in an area with the slope 2. Because $L_3 > L_2 > L_1$ and the working width of the autonomous robot is fixed, $\Delta_3 < \Delta_2 < \Delta_1$. Therefore, to ensure the work overlap value, a width value between adjacent path segments can be adaptively adjusted according to the slope angle.

Generally, the working width of the autonomous robot is determined by a working execution mechanism of the autonomous robot. For example, in an exemplary embodiment, when the autonomous robot is a robotic lawn mower, the diameter of a cutting deck of the robotic lawn mower is a working width of the robotic lawn mower.

Therefore, it can be seen that the work overlap value between adjacent path segments decreases with the increase of the slope angle. When the slope angle is greater than a particular value (for example, as shown by β in FIG. 3), the autonomous robot misses a working area, which reduces a work coverage ratio of the autonomous robot in the full-coverage mode.

For example, a working area of an automatic lawn mower is used as an example. An actual lawn usually has uneven terrain such as high slopes due to a special layout of a user's residential environment or garden. If the automatic lawn mower keeps performing coverage cutting based on a full-coverage working path planned based on a two-dimensional map, the autonomous robot is prone to a cutting miss in a high slope scenario.

In view of this, to solve the problem that an autonomous robot tends to miss a working area in a high slope scenario, the autonomous robot according to some embodiments of this specification is provided with a moving path planning apparatus. The moving path planning apparatus can automatically adjust a work overlap value between adjacent path segments during planning of a moving path in a target working area, to keep the work overlap value between the adjacent path segments within an appropriate range. Therefore, the problem that the autonomous robot misses a working area in a high slope scenario can be effectively prevented, and a work coverage ratio of the autonomous robot in a full-coverage mode is therefore improved.

In some embodiments of this specification, the automatically adjusting a work overlap value between adjacent path segments may include: automatically adjusting the work overlap value between the adjacent path segments according to environmental information of the autonomous robot.

Figure 4:
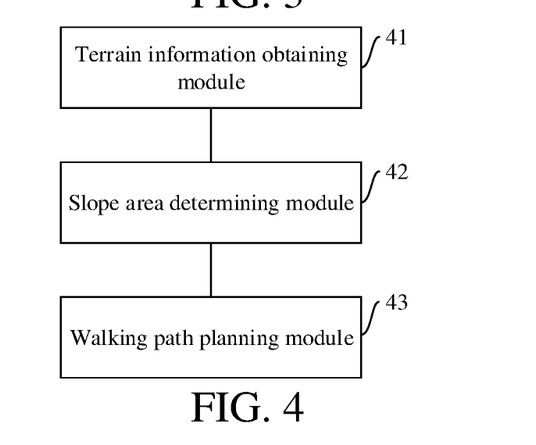
FIG. 4 is a structural block diagram of a moving path planning apparatus for an autonomous robot according to some embodiments of this specification.

For example, referring to FIG. 4, in some embodiments of this specification, the autonomous robot 100 includes a controller, the controller includes a moving path planning apparatus, and the moving path planning apparatus may include a terrain information obtaining module 41, a slope area determining module 42, and a moving path planning module 43. The terrain information obtaining module 41 may be configured to obtain terrain distribution information of a target working area. The slope area determining module 42 may be configured to determine, according to the terrain distribution information, whether a slope area exists in the target working area. The moving path planning module 43 may be configured to adjust, if a slope area exists in the target working area, a width value between adjacent path segments according to the terrain distribution information during planning of a moving path in the slope area, to keep a work overlap value between the adjacent path segments within a specified range (for example, 1 cm to 5 cm).

Based on the moving path planning apparatus, in the full-coverage working mode, if a slope area exists in the target working area, the autonomous robot may adjust a width value between adjacent path segments according to the terrain distribution information during planning of a moving path in the slope area, to keep a work overlap value between adjacent path segments within a range not less than zero, thereby effectively preventing the autonomous robot from missing a working area in the high slope scenario.

Figure 3:
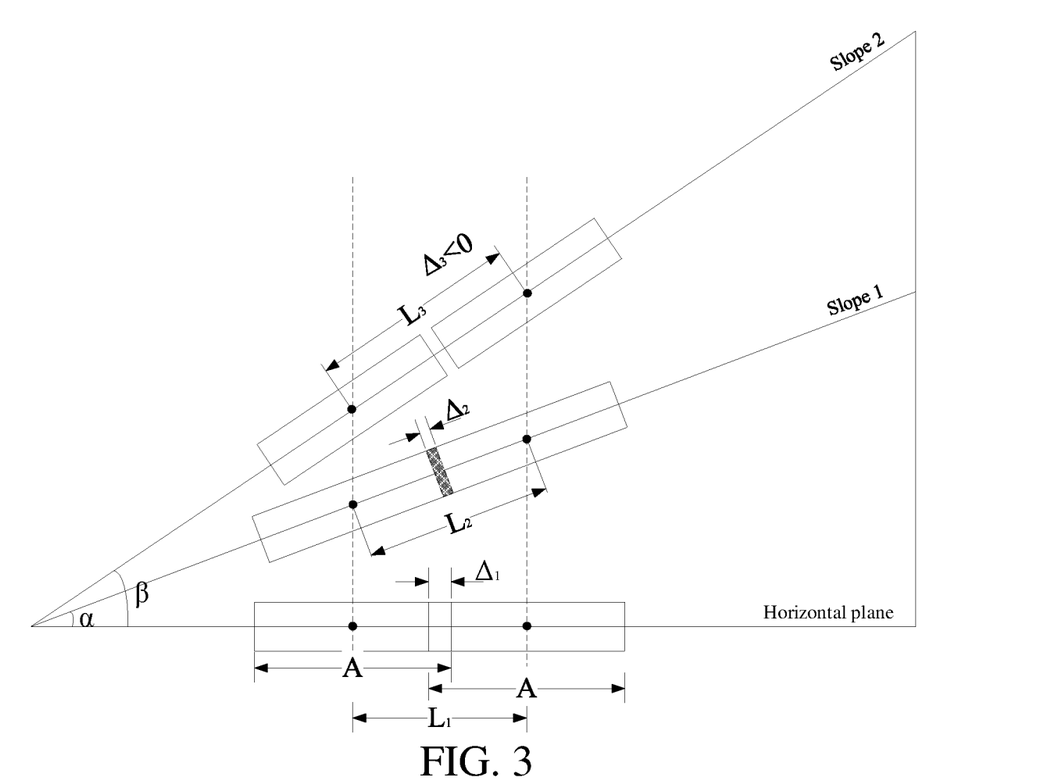
FIG. 3 is a schematic diagram of a case in which a work overlap value according to an embodiment of this specification changes with a slope.

In some embodiments of this specification, assuming that a path segment m and a path segment n are adjacent path segments, a distance from any location point x on the path segment n to the path segment m is a width between the location point x on the path segment n and the path segment m (for example, shown by $L_1$, $L_2$, and $L_3$ in FIG. 3). Therefore, the width $L_x$ between the location point x on the path segment n and the path segment m may be calculated by the formula $L_x = L_0/\cos \theta$, where θ is a slope angle of a slope surface at which the location point x is located, and $L_0$ is a width (which is generally a default value) between the path segment m and the path segment n when the autonomous robot is within a flat area. When the robot moves from the flat area to a slope, that is, when it is detected that the robot is on a slope, a width value between a path segment at which the current position point is located and a next path segment can be reduced. When the width value refers to $L_x$ on a slope, then enable an adjusted width value to be less than or equal to $L_x = L_0/\cos \theta$. When the width value refers to $L_0$ on a flat area, then enable an adjusted width value to be less than $L_0$.

In some other embodiments of this specification, on the premise that the work overlap value is not less than zero, the work overlap value should not be excessively large (for example, exceeds the value of a default work overlap value), to avoid affecting the working efficiency of the autonomous robot due to a large work overlap value.

Figure 5:
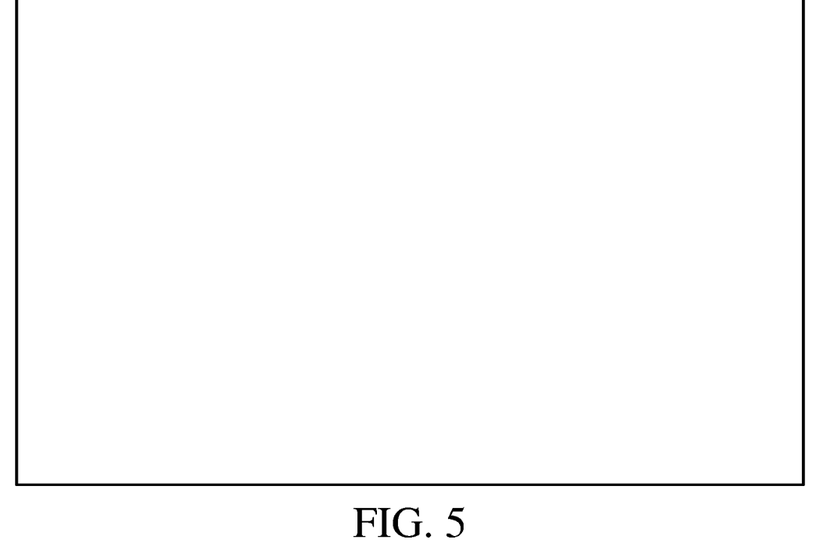
FIG. 5 is a schematic diagram of a two-dimensional map of a target working area according to an embodiment of this specification.

In some embodiments of this specification, the terrain information obtaining module 41 may allow the autonomous robot to traverse the target working area in advance and invoke an inclination sensor, a gyroscope, or the like provided in the autonomous robot to acquire slope distribution information of the target working area during traversal. For example, in an exemplary embodiment, the traversal may be implemented only to acquire slope distribution information. In another exemplary embodiment, the traversal may be performing a full-coverage work task and at the same time acquiring slope distribution information in the process of performing the work task. In the process of performing a full-coverage operation task, the path can be adjusted in real time in the process of collecting slope distribution information. Specifically, the autonomous robot plans a next moving path in real time when slope information is acquired at the current position point. When a next moving path corresponding to the current position point is planned, the autonomous robot adjusts, according to the slope, a width value between a path segment at which the current position point is located and the next path segment, to keep a work overlap value between adjacent path segments within a specified range. Certainly, before the traversal, the autonomous robot may plan the full-coverage working path according to a two-dimensional map (for example, as shown in FIG. 5) created in a mapping stage (it can be understood that, terrain is not taken into consideration in the planning of the full-coverage working path in this case), to facilitate the traverse of the target working area by the autonomous robot according to the full-coverage working path, thereby acquiring slope distribution information of the target working area.

Figure 6:
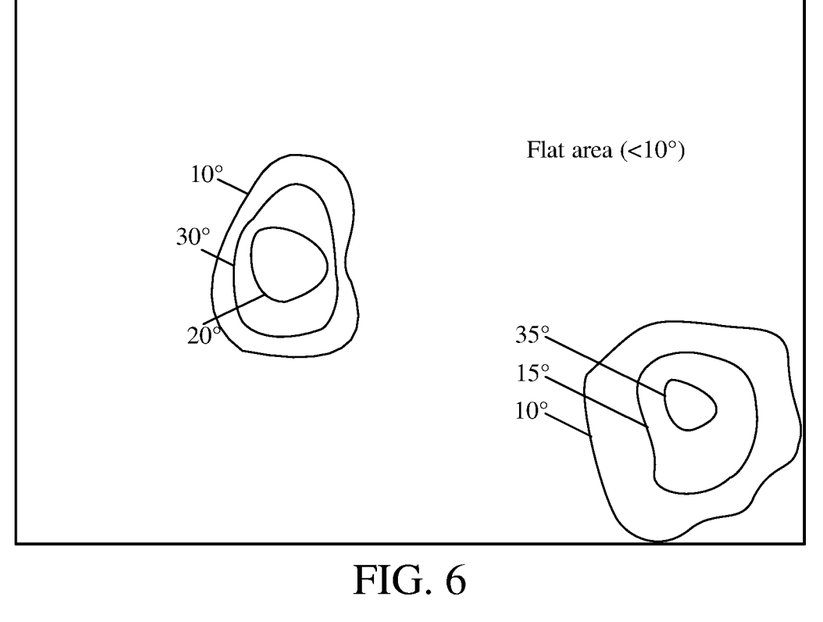
FIG. 6 is a schematic diagram of slope distribution of a target working area according to an embodiment of this specification.

Experiments and studies show that when the slope angle reaches a particular value (hereinafter referred to as a first slope angle value), the work coverage ratio of the autonomous robot in the full-coverage mode may be substantially affected. Therefore, the first slope angle value may be used as a boundary to define the flat area and the slope area. That is, in the target working area, an area with a slope angle less than the first slope angle value may be referred to as the flat area, and an area with a slope angle reaching the first slope angle value may be referred to as the slope area. Generally, the slope distribution information of the target working area may be represented by a uniform slope distribution map of the target working area. Therefore, the slope area determining module 42 may determine whether a slope area exists in the target working area through a uniform slope line on the uniform slope distribution map. For example, in an exemplary embodiment shown in FIG. 6, assuming that a slope angle of 10° is used as the first slope angle value, the slope area in the target working area may be determined by deleting or concealing contour lines of flat areas with slope angles less than 10° and keeping areas with slope angles not less than 10°.

If a slope area exists in the target working area, to appropriately plan a moving path in the slope area, the moving path planning module 43 may first partition the target working area. For example, when the slope area is a regular area (that is, the outer contour of the slope area has a regular shape such as a rectangle), the target working area may be directly partitioned by using the outer contour of the slope area as a boundary, to facilitate subsequent moving path planning.

Figure 7:
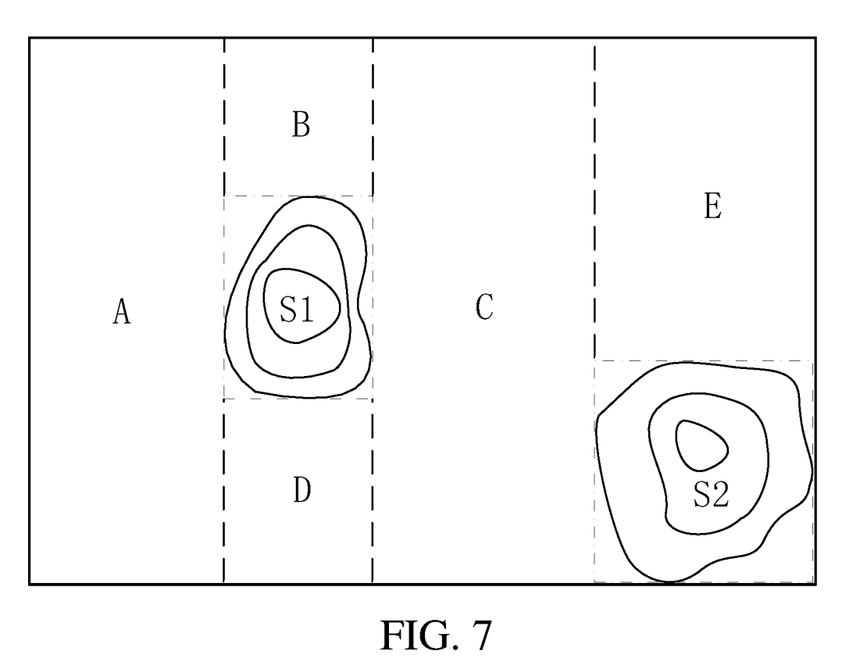
FIG. 7 is a schematic diagram of zones of a target working area according to an embodiment of this specification.

In some other embodiments of this specification, when the slope area is an irregular area (that is, the outer contour of the slope area has an irregular shape), the moving path planning module 43 may virtually regularize the slope area to make the slope area form a regular working area with a virtual boundary, thereby further facilitating subsequent moving path planning. For example, in an exemplary embodiment shown in FIG. 7, there are two slope areas S1 and S2 in the target working area. Because both S1 and S2 are irregular areas, S1 and S2 may be virtually regularized by, for example, generating the smallest circumscribed rectangles of S1 and S2 (for example, shown by the thin dot-dashed line in FIG. 7). After virtual regularization, the entire target working area may be divided into seven work zones A, B, C, D, E, S1, and S2 based on the virtual boundaries of S1 and S2 and the boundary of the target working area.

After the entire target working area is divided into a plurality of work zones, the moving path planning module 43 may separately plan a full-coverage working path for each work zone. Generally, for work zones located in the flat area, during planning of a square wave-shaped path, the moving path planning module 43 may plan each path segment according to a default path segment interval (that is, a width value between adjacent path segments). For work zones located in the slope area, to avoid missing a working area, the moving path planning module 43 may adaptively adjust a width value (for example, adjust $L_2$ and $L_3$ in FIG. 3) between adjacent path segments according to a slope angle value of each location point on adjacent path segments and the working width of the autonomous robot, to keep the work overlap value between the adjacent path segments within a specified range. The adaptive adjustment means that a width value between adjacent path segments is adjusted according to the largest slope angle value (for example, 0°, 20°, 30°) of a slope area having different slopes, so that even at the largest slope angle, the corresponding work overlap value is positive, that is, there is no possibility of missing a working area.

Figure 9:
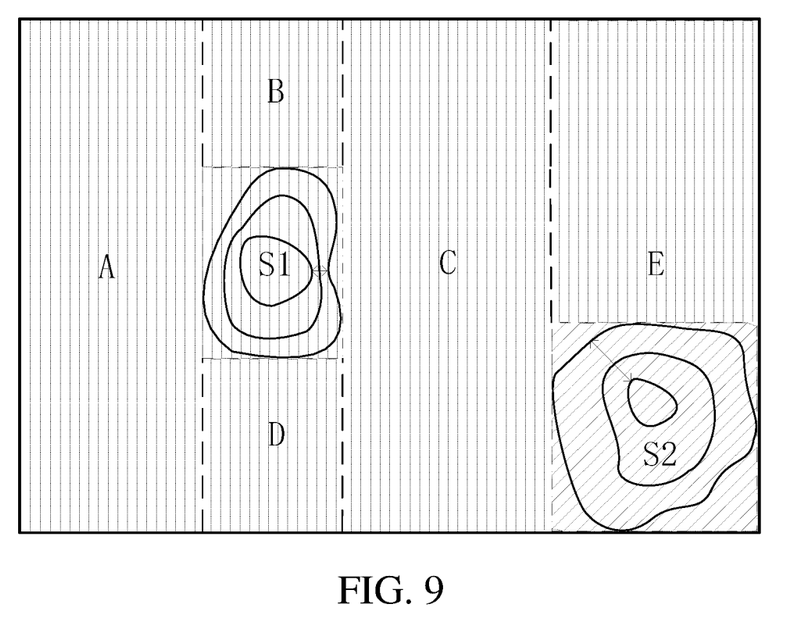
FIG. 9 is a schematic diagram of planning of a full-coverage working path for a target working area according to an embodiment of this specification.

A square wave-shaped path is used as an example. For work zones located in the flat area, during planning of the square wave-shaped path, the moving path planning module 43 can plan each path segment according to a default moving direction (for example, a moving direction in the five work zones A, B, C, D, and E in FIG. 9 is the default moving direction). For work zones located in the slope area, in consideration of a climbing limit of the autonomous robot and other factors, during planning of moving directions in the work zones located in the slope area, the moving path planning module 43 needs to avoid a gradient direction of the slope area as much as possible, making it less difficult for the autonomous robot to climb.

Figure 8:
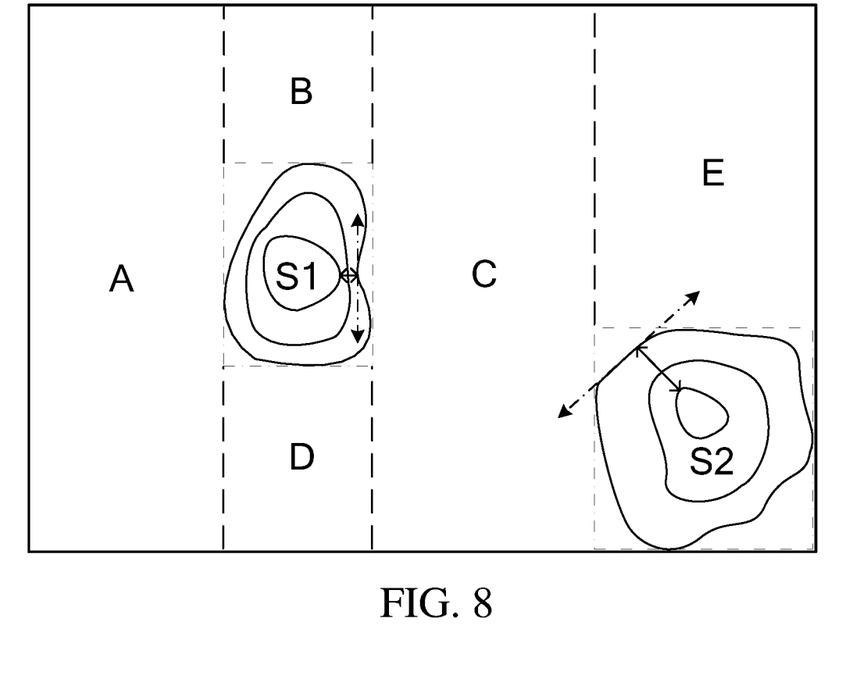
FIG. 8 is a schematic diagram of a direction of a moving path in a slope area within a target working area according to an embodiment of this specification.

For example, in an embodiment of this specification, if a slope area exists in the target working area, the moving path planning module 43 may first determine the gradient direction of the slope area (for example, as shown by a solid double-headed arrow in FIG. 8); and determine whether a slope angle value corresponding to the gradient direction exceeds a second slope angle value (the second slope angle value may be set based on the climbing limit of the autonomous robot), where the second slope angle value is greater than the first slope angle value. If the slope angle value corresponding to the gradient direction exceeds the second slope angle value, it indicates that the largest slope angle of the slope area may affect the climbing of the autonomous robot. Therefore, during planning of a moving path in the work zones located in the slope area, the moving path planning module 43 may keep an angle between the moving direction of the moving path and the gradient direction within a specified angle range.

In another embodiment of this specification, if the slope angle value corresponding to the gradient direction exceeds the second slope angle value, during planning of a moving path in the work zones located in the slope area, the moving path planning module 43 may make the angle between the moving direction of the moving path and the gradient direction be a specified value. When the specified value is larger, it is less difficult for the autonomous robot to climb. Therefore, when the specified value is 90° (for example, as shown by dot-dashed double-headed arrow in FIG. 8), the difficulty for the autonomous robot to climb can be reduced to the minimum.

Certainly, in another embodiment of this specification, if the slope angle value corresponding to the gradient direction does not exceed the second slope angle value, it indicates that the largest slope angle of the slope area does not affect the climbing of the autonomous robot. Therefore, during planning of a moving path in the slope area, the moving path planning module 43 may use the default moving direction as the moving direction of the moving path.

After the moving direction of each path segment in each work zone and the path segment interval is determined, the corresponding square wave-shaped path can be drawn (for example, as shown in FIG. 9), thereby completing the planning of the full-coverage working path for the target working area while taking the slope information of the target working area into consideration. After the planning of the full-coverage working path for the target working area is completed, the autonomous robot can subsequently perform each full-coverage work task according to the full-coverage working path. In another application scenario of the present application, after a work area map is obtained, the robot can move in the work area in a square wave shape. When detecting that a slope exists in the process of moving in the square wave-shape, the robot adjusts a width value between the next moving path and a path at which the current position point is located, to keep a work overlap value between adjacent path segments within a specified range.

For ease of description, when the apparatus is described, the apparatus is divided into units according to functions, which are separately described. Certainly, during implementation of this specification, the functions of the units may be implemented in the same piece of or a plurality of pieces of software and/or hardware.

Corresponding to the foregoing moving path planning apparatus for an autonomous robot, a moving path planning method for an autonomous robot of this specification may include: automatically adjusting a work overlap value between adjacent path segments during planning of a moving path in a target working area.

In some embodiments of this specification, the automatically adjusting a work overlap value between adjacent path segments may include: automatically adjusting the work overlap value between the adjacent path segments according to environmental information of the autonomous robot.

Figure 10:
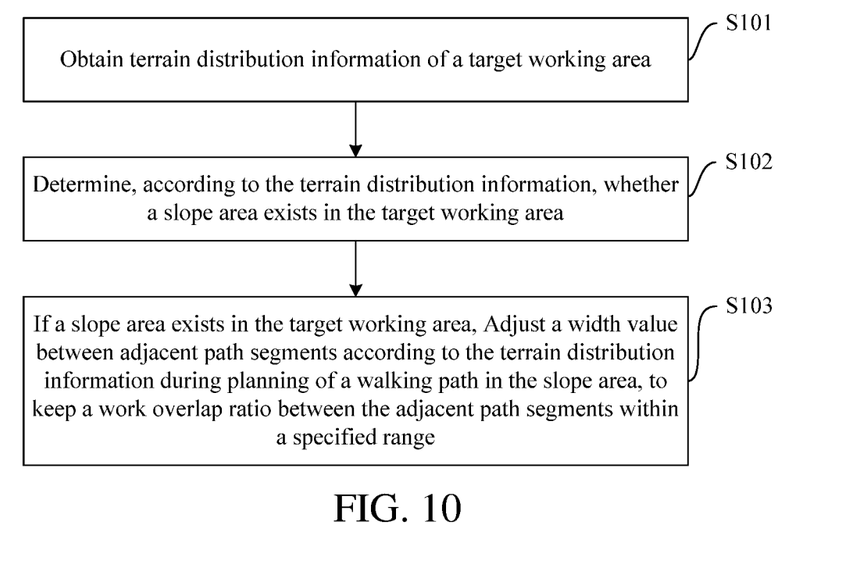
FIG. 10 is a flowchart of a moving path planning method for an autonomous robot according to some embodiments of this specification.

For example, referring to FIG. 10, in some embodiments of this specification, the moving path planning method for an autonomous robot may include the following steps:

S101: Obtain terrain distribution information of a target working area.

S102: Determine, according to the terrain distribution information, whether a slope area exists in the target working area, where a slope angle value of the slope area reaches a first slope angle value.

S103: Determine, if a slope area exists in the target working area, a width value between adjacent path segments according to the terrain distribution information during planning of a moving path in the slope area, to keep a work overlap value between the adjacent path segments within a specified range.

In the moving path planning method according to some embodiments of this specification, the terrain distribution information includes at least one of the following: slope distribution information, absolute height distribution information, relative height difference distribution information, or height change rate distribution information.

In the moving path planning method according to some embodiments of this specification, the determining, according to the terrain distribution information, whether a slope area exists in the target working area includes:
  determining, according to whether a slope angle value of the slope area reaches a first slope angle value, whether a slope area exists in the target working area.

In the moving path planning method according to some embodiments of this specification, the determining a width value between adjacent path segments according to the slope distribution information includes:
  determining the width value between the adjacent path segments according to a slope angle value of each location point on the adjacent path segments and a working width of the autonomous robot.

In the moving path planning method according to some embodiments of this specification, the method further includes:
  when a slope area exists in the target working area, determining a gradient direction of the slope area;
  determining whether a slope angle value corresponding to the gradient direction exceeds a second slope angle value, where the second slope angle value is greater than the first slope angle value; and
  if the slope angle value corresponding to the gradient direction exceeds the second slope angle value, keeping an angle between a moving direction of the moving path and the gradient direction within a specified angle range during planning of the moving path in the slope area.

In the moving path planning method according to some embodiments of this specification, the keeping an angle between a moving direction of the moving path and the gradient direction within a preset angle range includes:
  making the angle between the moving direction of the moving path and the gradient direction be a specified value.

In the moving path planning method according to some embodiments of this specification, the method further includes:
  if the slope angle value corresponding to the gradient direction does not exceed the second slope angle value, using a default moving direction as the moving direction of the moving path during planning of the moving path in the slope area.

In the moving path planning method according to some embodiments of this specification, the obtaining terrain distribution information of a target working area includes:
  acquiring the terrain distribution information of the target working area in a process of making the autonomous robot traverse the target working area.

In the moving path planning method according to some embodiments of this specification, the terrain distribution information of a target working area includes:
  a uniform slope distribution map of the target working area.

Although the processes described above include a plurality of operations that appear in a particular sequence, it should be clearly understood that these processes may include more or fewer operations which can be performed in sequence or in a parallel manner (for example, by using a parallel processor or in a multithread environment).

The embodiments of present invention is described with reference to the flowcharts and/or block diagrams of the method, the device (system), and the computer program product according to the embodiments of the present invention. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a mach essential essential ine, so that an apparatus configured to implement functions specified in one or more procedures in the flowcharts and/or one or more blocks in the block diagrams is generated by using instructions executed by the computer or the processor of another programmable data processing device.

These computer program instructions may be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), an input/output (I/O) interface, a network interface, and an internal memory.

The memory may include a form such as a volatile memory, a random access memory (RAM), and/or a non-volatile memory such as a read-only memory (ROM) or a flash memory (flash RAM) in a computer-readable medium. The memory is an example of the computer-readable medium.

The computer-readable medium includes a non-volatile medium and a volatile medium, a removable medium and a non-removable medium, which may implement storage of information by using any method or technology. The information may be a computer-readable instruction, a data structure, a program module, or other data. Examples of a storage medium of a computer include, but are not limited to, a phase change memory (PRAM), a static random access memory (SRAM), a dynamic random access memory (DRAM), or other types of RAMs, a ROM, an erasable programmable read only memory (EEPROM), a flash memory or another storage technology, a compact disc read-only memory (CD-ROM), a digital versatile disc (DVD) or another optical storage, or a cartridge tape. A magnetic storage of a magnetic disk or a disc, another magnetic storage device, or any other non-transmission medium may be configured to store information that can be accessed by a computing device. Based on the description in the present disclosure, the computer-readable medium does not include transitory computer-readable media (transitory media), such as a modulated data signal and a carrier.

It should be further noted that the terms "include", "comprise", or any variants thereof are intended to cover a non-exclusive inclusion. Therefore, a process, method, or device that includes a series of elements not only includes such elements, but also includes other elements not specified expressly, or may include inherent elements of the process, method, or device. Without further limitation, the element defined by a phrase "include one" does not exclude other same elements in the process, method, or device which include the element.

A person skilled in the art should understand that the embodiments of this specification may be provided as a method, a system, or a computer program product. Therefore, this specification may use a form of hardware only embodiments, software only embodiments, or embodiments with a combination of software and hardware. Moreover, this specification may use a form of a computer program product that is implemented on one or more computer-usable storage media (including but not limited to a disk memory, a CD-ROM, an optical memory, and the like) that include computer-usable program code.

This specification can be described in the general context of computer-executable instructions executed by a computer, for example, program modules. Generally, the program module includes a routine, a program, an object, a component, a data structure, and the like for executing a particular task or implementing a particular abstract data type. This specification may be implemented in a distributed computing environment in which tasks are performed by remote processing devices connected by using a communication network. In a distributed computing environment, the program module may be located in both local and remote computer storage media including storage devices.

The embodiments of this specification are all described in a progressive manner, for same or similar parts in the embodiments, refer to these embodiments, and descriptions of each embodiment focus on a difference from other embodiments. Especially, a method embodiment is basically similar to an apparatus embodiment, and therefore is described briefly; for related parts, reference may be made to partial descriptions in the apparatus embodiment.

The descriptions are merely embodiments of this specification, and are not intended to limit this specification. For a person skilled in the art, various modifications and changes may be made to this specification. Any modification, equivalent replacement, and improvement made within the spirit and principle of this specification shall fall within the scope of the claims of this specification.

What is claimed is:

1. A moving path planning method for an autonomous robot comprising:
   determining that a slope exists at a current position point;
   adjusting a width value between a path segment where the current position point is located and a next path segment according to the slope, to keep a work overlap value between adjacent path segments within a specified range, the adjusting including:
      adjusting, according to the slope, the width value between the path segment where the current position point is located and the next path segment, to enable an adjusted width value to be less than or equal to a ratio of a width between the adjacent path segments in a flat area to a cosine of a slope angle of the slope; and
   controlling the autonomous robot to move along the next path segment.

2. The moving path planning method for the autonomous robot according to claim 1, wherein when the slope is greater than or equal to 10°, the work overlap value between the adjacent path segments is greater than or equal to 1 cm and less than or equal to 5 cm.

3. A moving path planning method for an autonomous robot comprising:
   obtaining terrain distribution information of a target working area;
   determining, according to the terrain distribution information that a slope area exists in the target working area;
   adjusting a width value between adjacent path segments according to the terrain distribution information during planning of a moving path in the slope area, to keep a work overlap value between the adjacent path segments within a specified range, the adjusting including:
      adjusting, according to a slope of the slope area, the width value between the adjacent path segments, to enable an adjusted width value to be less than or equal to a ratio of a width between the adjacent path segments in a flat area to a cosine of a slope angle of the slope; and
   controlling the autonomous robot to move along the slope area.

4. The moving path planning method for the autonomous robot according to claim 3, wherein the terrain distribution information comprises at least one of: slope distribution information, absolute height distribution information, relative height difference distribution information, or height change rate distribution information.

5. The moving path planning method for the autonomous robot according to claim 3, wherein the determining, according to the terrain distribution information, that the slope area exists in the target working area comprises:
   determining that a slope angle value of the target working area reaches a first slope angle value; and
   determining that the slope area exists in the target working area.

6. The moving path planning method for the autonomous robot according to claim 5, wherein the adjusting the width value between the adjacent path segments comprises:
   adjusting the width value between the adjacent path segments according to a slope angle value of each location point on the adjacent path segments and a working width of the autonomous robot.

7. The moving path planning method for the autonomous robot according to claim 5, wherein the moving path planning method further comprises:
   determining a gradient direction of the slope area;
   determining that a slope angle value corresponding to the gradient direction exceeds a second slope angle value, wherein the second slope angle value is greater than the first slope angle value; and
   keeping an angle between a moving direction of a moving path and the gradient direction within a specified angle range during planning of the moving path in the slope area.

8. The moving path planning method for the autonomous robot according to claim 7, wherein the keeping the angle between the moving direction of the moving path and the gradient direction within the specified angle range comprises:
   making the angle between the moving direction of the moving path and the gradient direction be a specified value.

9. The moving path planning method for the autonomous robot according to claim 7, wherein the moving path planning method further comprises:
   determining that the slope angle value corresponding to the gradient direction does not exceed the second slope angle value; and
   using a default moving direction as the moving direction of the moving path during planning of the moving path in the slope area.

10. The moving path planning method for the autonomous robot according to claim 3, wherein the obtaining the terrain distribution information of the target working area comprises:
    acquiring the terrain distribution information of the target working area in a process of making the autonomous robot traverse the target working area.

11. The moving path planning method for the autonomous robot according to claim 3, wherein the terrain distribution information of the target working area comprises:
    a uniform slope distribution map of the target working area.

12. An autonomous robot comprising:
    one or more processors; and
    one or more memories storing thereon computer program instructions that, when executed by the one or more processors, cause the one or more processors to perform acts comprising:
       determining that a slope exists at a current position point;
       adjusting a width value between a path segment where the current position point is located and a next path segment according to the slope, to keep a work overlap value between adjacent path segments within a specified range, the adjusting including:
          adjusting, according to the slope, the width value between the path segment where the current position point is located and the next path segment, to enable an adjusted width value to be less than or equal to a ratio of a width between the adjacent path segments in a flat area to a cosine of a slope angle of the slope; and
    controlling the autonomous robot to move along the next path segment.

* * * * *